July 9, 1957　　　　　F. R. NICHOLSON　　　　　2,798,677
SPEED CONTROL DEVICE FOR REWINDING APPARATUS
Filed July 22, 1955　　　　　　　　　　　　　4 Sheets-Sheet 1

INVENTOR
FRANK RAYMUND NICHOLSON

BY Herbert M. Wolfson

ATTORNEY

July 9, 1957

F. R. NICHOLSON 2,798,677

SPEED CONTROL DEVICE FOR REWINDING APPARATUS

Filed July 22, 1955

INVENTOR
FRANK RAYMUND NICHOLSON

BY *Herbert M. Wolfson*

ATTORNEY

July 9, 1957 F. R. NICHOLSON 2,798,677
SPEED-CONTROL DEVICE FOR REWINDING APPARATUS
Filed July 22, 1955 4 Sheets-Sheet 4

INVENTOR
FRANK RAYMUND NICHOLSON

BY *Herbert M. Wolfsen*

ATTORNEY

United States Patent Office 2,798,677
Patented July 9, 1957

2,798,677

SPEED CONTROL DEVICE FOR REWINDING APPARATUS

Frank Raymund Nicholson, Buffalo, N. Y., assignor to E. I. du Pont de Nemours and Company, Wilmington, Del., a corporation of Delaware Application July 22, 1955, Serial No. 523,868

6 Claims. (Cl. 242—55.15)

This invention relates to improvements in rewinding machines and is particularly useful in slitting and rewinding machines.

In slitting and rewinding machines, a relatively wide web passes around a constant speed roll against which the cutters operate to cut the web to desired narrower rewind widths. These cut widths or strips pass to rewind rolls mounted on a positively driven rewind shaft. To insure smooth rewinding, tension is maintained on the strips as they are rewound. To provide tension the rewind shaft is rotated at a higher rate than desired for the rewind rolls. Slippage between the rewind drive and the rolls by means of a driving clutch or the like enables the rewind rolls to rotate and receive the strips at the rate that the strips are fed from the constant speed roll while simultaneously maintaining tension on the strips. The difference between the speed of rotation of the drive shaft and the speed of rotation of the rewind rolls is called "over-drive."

As material builds up on the rewind rolls, the speed of rotation of the rewind rolls will decrease and, if the speed of rotation of the drive shaft were not to change, the amount of over-drive would increase. I have observed that when the over-drive is greater than about 50 revolutions per minute, slippage becomes non-uniform and difficult to control. Furthermore, excessive heat due to slippage is developed which may affect the properties of the strip material.

The object of this invention is to control overdrive. Another object is to provide a machine in which the driving speed of the rewind shaft is varied in accurate relationship to the size of the wound strips on the rewind rolls. A further object is to control the speed of the rewind shaft so that as the diameter of material on the rewind roll increases, the rotative speed of the rewind shaft is correspondingly decreased. Other objects and advantages will be apparent from the following description in conjunction with the accompanying drawings which show the preferred form of the invention.

Referring to the accompanying drawings, in which the same reference characters indicate the same parts in the various views—

Figure 1:
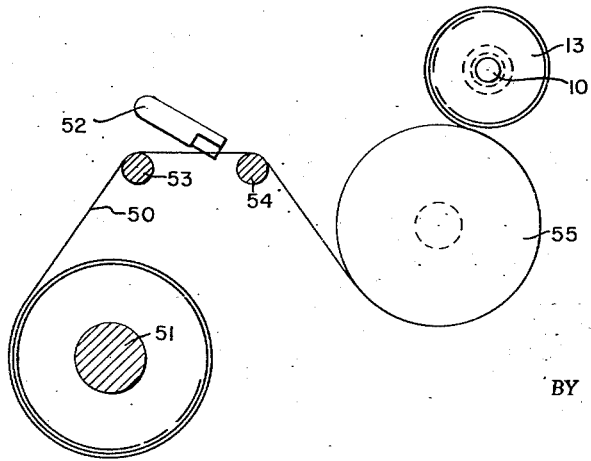
Figure 1 is a simplified schematic drawing of a slitting machine wherein the apparatus of the present invention is highly useful.

Figure 1 illustrates the path of a continuous length of film 50 as it is unwound from supply roll 51, and is thereafter slit by knife 52, positioned between supporting rolls 53 and 54, and then over the surface of the main driving roll 55. From the driving roll 55 the film in the form of narrow strips is wound upon cores 13, 13a, 13b, etc., mounted on windup mandrel 10.

Figure 2:
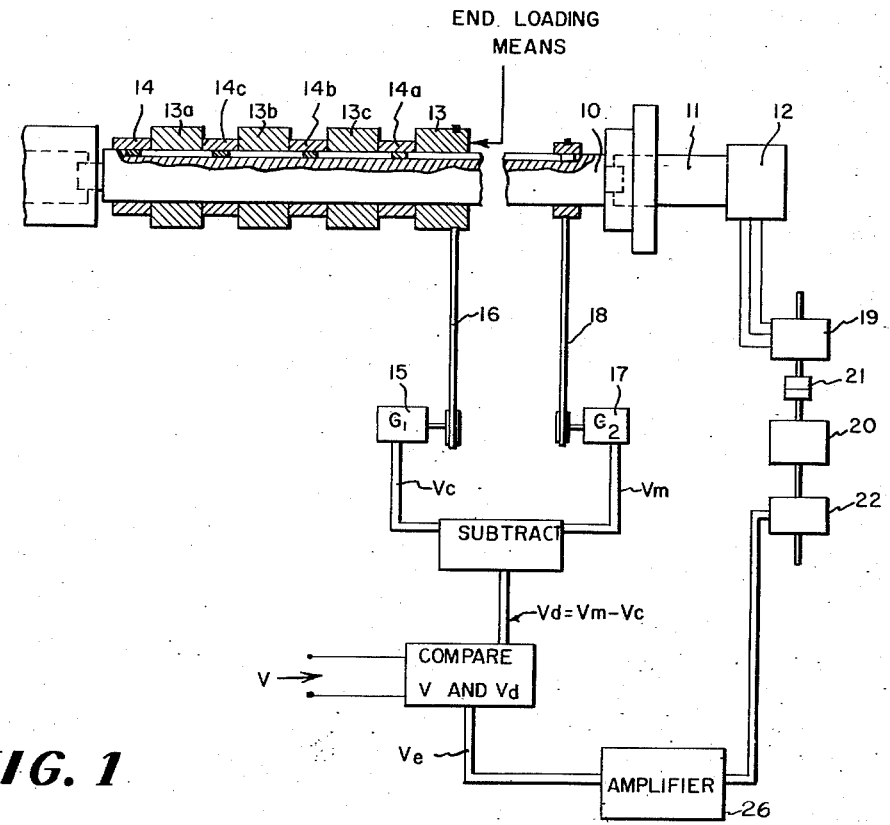
Figure 2 is a diagrammatic sketch showing the electrical components in conjunction with one embodiment of the invention.

Figure 2 which is a simplified diagram of one embodiment of the apparatus shows windup mandrel 10, being driven by drive shaft 11, which in turn is driven by a motor 12. The windup cores 13a, 13b and 13c, are placed on the windup mandrel 10 so that they are free to rotate. Between the cores 13a, 13b, etc., are placed spacer rings 14a, 14b and 14c, which are keyed to the windup mandrel 10, and therefore rotate at the same speed as the windup mandrel. The cores are pushed into positive contact with the spacer rings by an end loading means, not shown but indicated by arrow, and an end spacer ring 14. An end windup core 13 is connected to a tachometer generator 15 through a positive driving linkage 16. In a similar manner tachometer generator, 17 is connected through a positive driving linkage 18 to the windup mandrel 10. Hence the voltage output $V_c$ of generator 15, is directly proportional to the rate of rotation of the wind-up core 13. Voltage $V_m$ is directly proportional to the output of generator 17, determined by the rate of rotation of the wind-up mandrel 10. Since it is necessary to have the wind-up mandrel 10 rotate at a speed slightly greater (but not over 50 revolutions per minute) than that of the web winding means (cores 13—13c), so as to maintain tension on the strips being wound, the voltage $V_m$ will be greater than the voltage $V_c$. Then, as shown diagrammatically, the voltages are connected in series opposition and their difference is signified by voltage $V_d$. Voltage $V_d$ is then compared with a preset voltage $V$ which is related to the over-drive desired. The error voltage signal $V_e$ which is obtained by connecting voltages $V$ and $V_d$ in series opposition is then amplified and transmitted to the speed control potentiometer 19 of the drive shaft motor 12, through a rebalance motor 20, a slip clutch 21, and damping tachometer generator, 22. Under normal operating conditions, the error voltage signals serve to decelerate the drive motor 12 as the strips build up on the cores.

Instead of directly mounting the cores on the wind-up mandrel, the cores may be mounted on separate pivot arms as in my copending application U. S. Serial No. 401,134, filed December 30, 1953, and driven through driving linkages connected to gears or similar core-driving means. In this case the core-driving means (rather than the cores) and the spacer rings are mounted on the mandrel. The tachometer generator 15 would then be connected through a driving linkage to one of the core-driving means.

Figure 3:
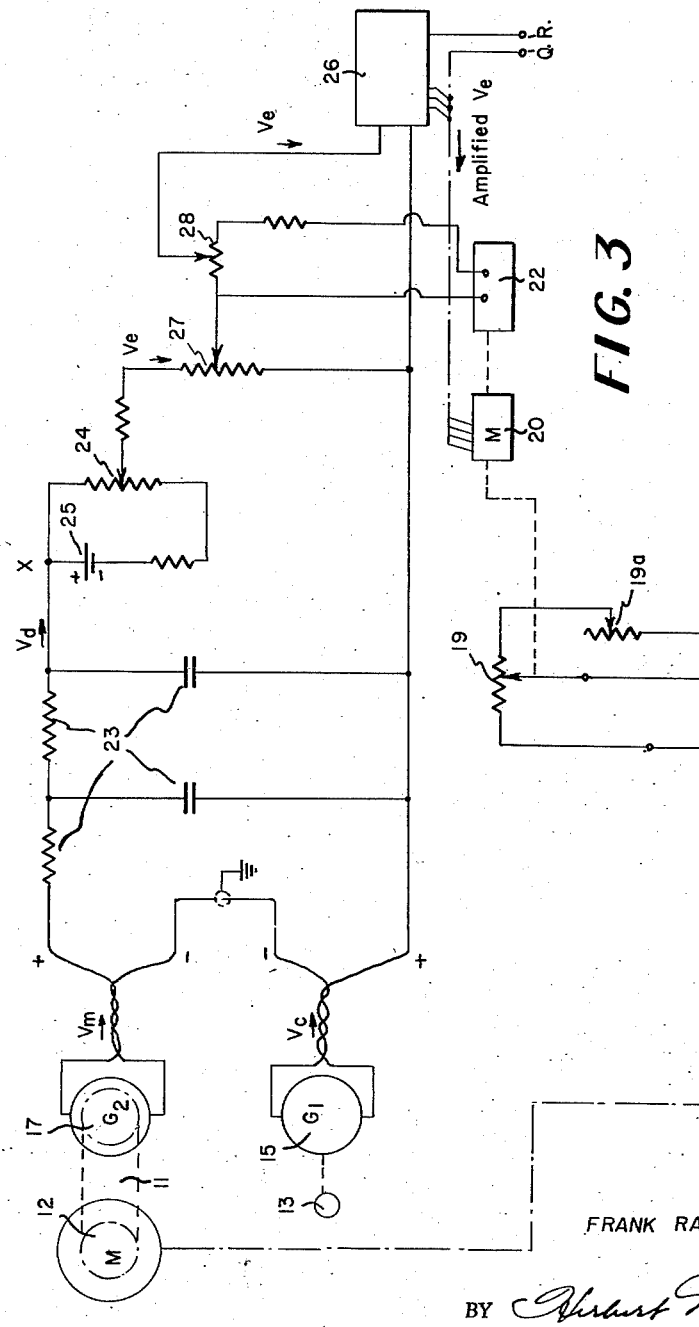
Figure 3 is a wiring diagram of the electrical components used in one embodiment of the invention.

In Figure 3, the electrical circuit is shown in greater detail. The electrical outputs of the two tachometer generators 15 and 17 are connected in series opposition. The resulting voltage difference, $V_d$, represents the difference between the mandrel speed and the speed of the end core 13 the "over-drive." This voltage is fed through a two-section RC filter 23 to remove most of the commutation ripple. The resultant potential $V_d$ is connected in series opposition to a positive potential $V$, developed at point $x$. The magnitude of the positive potential at $x$ is selected by a set point control circuit consisting of potentiometer 24, and cell 25, and determines the amount of over-drive to be maintained. When the windup mandrel is rotated at the desired overdrive, $V_d$ would be exactly balanced by the counter-potential at point $x$. Under any other conditions there is a resultant error potential, $V_e = (V_d - V)$ which is fed to the input of an amplifier 26, through the gain control potentiometer 27, and the damping circuit consisting of a potentiometer 28, and a generator 22. The amplified error voltage $V_e$ drives the rebalance motor 20 which is mechanically connected to the ten-turn potentiometer 19. This potentiometer 19 is in the field circuit of the mandrel drive motor 12 to control its speed and thereby the output of generator 17. Thus, amplified $V_e$ will drive the rebalance motor 20 in a direction gradually moving the potentiometer 19 to its low speed end and, thus, lowering the speed of the mandrel drive motor 12 as material builds up on the cores. A damping tachometer generator 22 is mechanically connected to the shaft of the rebalance motor 20, furnishing an out-of-phase voltage proportional to the motor speed to prevent oscillation or hunting of the rebalance motor 20. The magnitude of the out-of-phase voltage from tachometer generator 22 can be adjusted by means of the damping potentiometer 28 to permit easy adjustment of the applied damping voltage to suit the circuit characteristics.

The foregoing description outlines the operation of the electrical controls for the over-drive while the slitting machine is operating. When the machine is at rest, unique conditions prevail. Under these conditions, the two generators are at rest. $V_c$, $V_m$ and $V_d$ are equal to zero. Consequently a permanent error signal equal to V would be fed from the set point circuit (potentiometer 24 and cell 25) directly into the amplifier 26. Since the drive shaft motor is at rest, this signal would operate on the rebalance motor driving the potentiometer to its high speed end. To avoid this, one of the connections from the amplifier 26 to the rebalance motor 20 is separated at points Q and R. It is arranged so that when the slitting machine stops (the cores cease to rotate), this connection QR is automatically severed by a solenoid or similar relay device, thus taking the over-drive control temporarily out of the circuit. Thus, the over-drive control follows the mandrel speed down maintaining the preset over-drive as the drive shaft decelerates. Because of the difficulties discussed previously which are inherent in the system should the drive shaft stop while the over-drive control circuit is still in operation, a base speed potentiometer 19a is used to maintain rotation of the drive shaft as the contacts Q and R open. The base speed potentiometer, 19a, may be set at any convenient value; usually a value that will rotate the mandrel at a speed suited to the minimum speed of the machine. On starting up the machine, the connection QR is automatically remade and the control again comes into operation.

Figure 4:
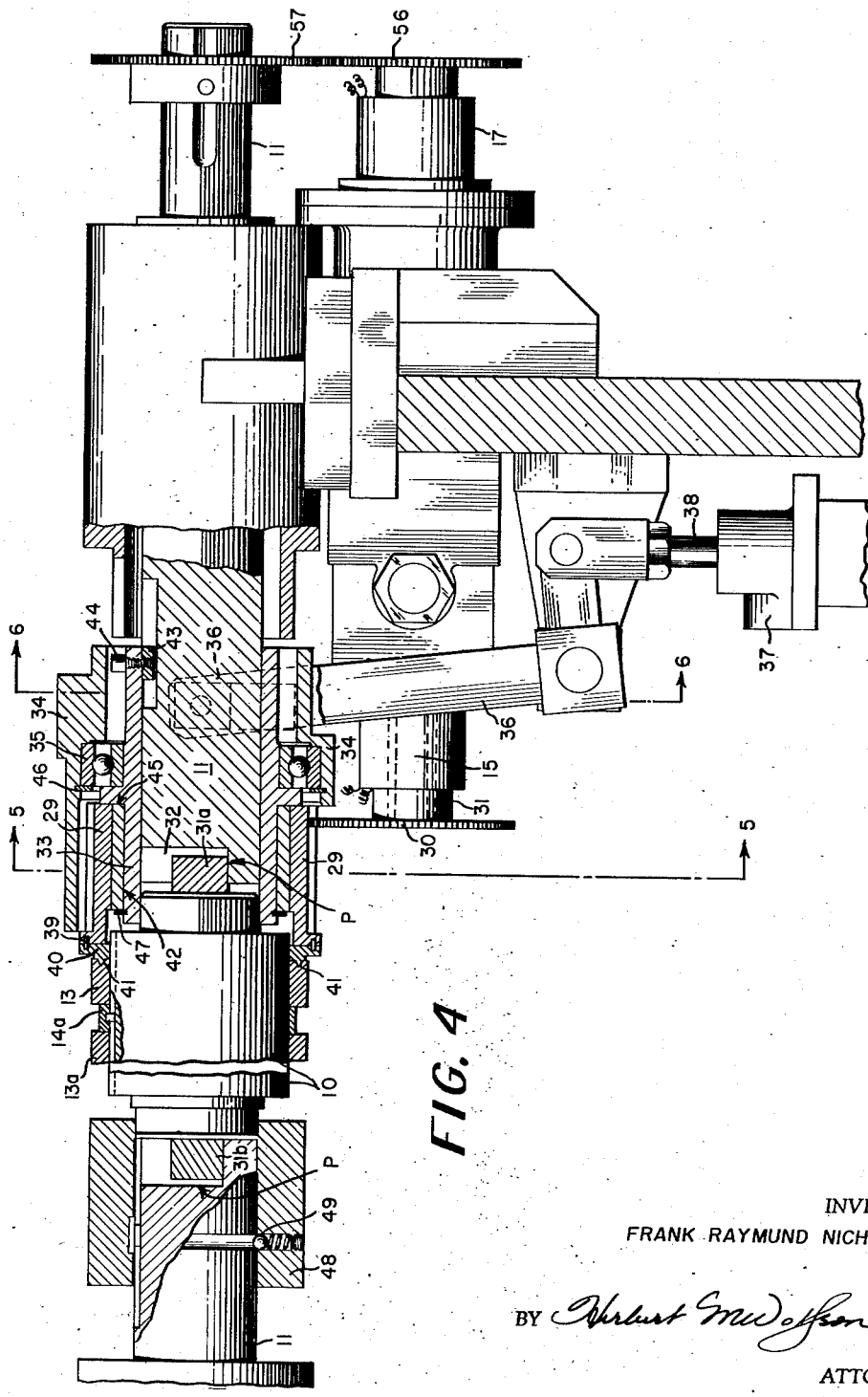
Figure 4 is a plan view of a preferred embodiment of the invention.
Figure 5:
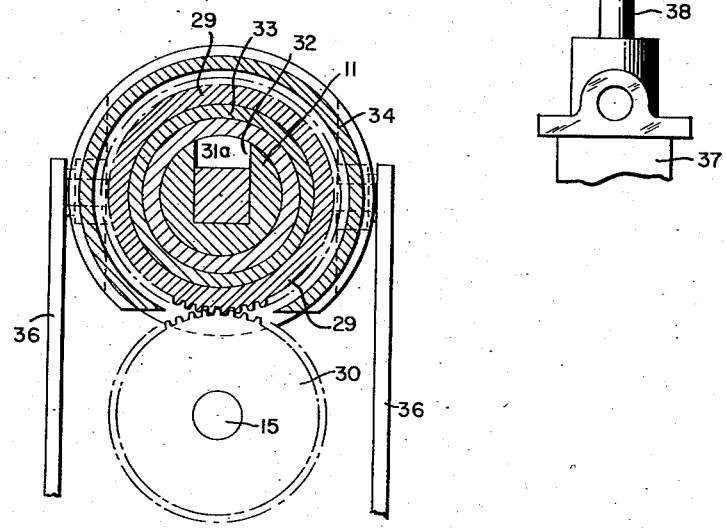
Figure 5 is a sectional view taken along the line 5—5 of Figure 4.

Figure 4 is an illustration of a unique and preferred embodiment of this invention. The windup mandrel 10 is connected to drive shaft 11, at points P. The rate of rotation of cores 13, 13a, etc., maintained in spaced relationship upon the mandrel by keyed spacer rings 14a, 14b, etc., is continuously followed by sleeve gear 29, which in turn is attached to toothed wheel 30 affixed to the drive shaft 31 of tachometer generator 15. Figure 5, a partial section along line 5—5 of Figure 4, illustrates the detail of the connection between windup mandrel 10, and drive shaft, 11. That is, the square ends 31a and 31b, of the windup mandrel 10, are inserted into mandrel slots 32 in the body of the drive shaft 11. Hence, through this connection the windup mandrel is positively driven at the same speed as drive shaft 11. The arrangement for continuously following the varying speed of cores 13, 13a, etc., provides for easy and rapid removal of the windup mandrel 10 from the mandrel slots 32 in drive shaft 11 without disconnecting the driving linkage, e. g., meshing gear teeth between sleeve gear 29, and toothed wheel 30.

Figure 6:
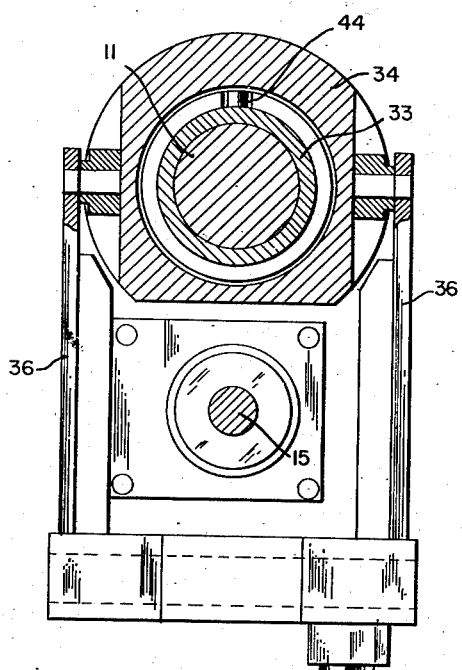
Figure 6 is a sectional view taken along the line 6—6 of Figure 4.

The assembly of apparatus adjacent sleeve gear 29 consists of sleeve 33, loading sleeve 34, ball bearing ring 35, and yoke assembly 36 which is attached to loading sleeve 34. The connection between the yoke assembly and the loading sleeve is shown most clearly in Figure 6, a partial section along line 6—6. Air applied from cylinder 37 applies pressure upon piston 38 which in turn pushes yoke assembly 36 forward. This in turn applies the end pressure upon the assembly of alternate cores and spacing rings mounted upon the windup mandrel 10. Hence, the end pressure provides for frictionally driving cores 13, 13a, etc., by keyed spacer rings 14a, 14b, etc. The net result of the application of air pressure from cylinder 37 pushing yoke assembly 36 forward is the application of end pressure against the last core 13, and thereby upon the entire assembly by the abutting forward surface of sleeve gear 29 which is pinned by pin 39 to a ring 40 containing a multiplicity of pointed nibs 41, which protrude into the core 13. Upon rotation of windup mandrel 10, and corresponding rotation of rings 14a, 14b, etc., which drive cores 13, 13a, etc., the sleeve gear 29 is free to rotate independently of the windup mandrel upon bearing surface 42. Consequently sleeve gear 29 rotates at substantially the same speed as cores 13, 13a, etc. Sleeve 33 is free to slide longitudinally on the drive shaft 11, but it rotates with drive shaft 11. That is, sleeve 33 is keyed to drive shaft 11 by key 43, attached to sleeve 33 by screwed peg 44. Hence, slippage between sleeve gear 29, and sleeve 33, not only occurs along bearing surface 42, but at the surface interface 45. The end thrust upon sleeve gear 29 is provided by the thrust of the yoke arrangement 36 upon loading sleeve 34 which in turn transmits the thrust to sleeve gear 29 through ball bearing ring 35, and sleeve 33. When the air pressure upon piston 38 is reversed the entire assemblage consisting of sleeve 33, sleeve gear 29, ball bearing ring 35, and loading sleeve 34 may be slid back as a unit to provide easy removal of windup mandrel 10 from the mandrel slots 32, and drive shaft 11. These parts move back and forward as a unit because ball bearing ring 35 is force fitted upon sleeve 33. Retaining ring 46 holds loading sleeve 34, and ball bearing ring 35 in close contact, and retaining ring 47 holds sleeve gear 29, and sleeve 33 in close contact.

The teeth of sleeve gear 29 mesh with the teeth of wheel 30, which in turn is attached to the main shaft of tachometer generator 15. Upon reversing air pressure upon the yoke assembly 36 the aforementioned parts move back as a unit beyond the area on the drive shaft above mandrel slot 32. This longitudinal movement of the assemblage permits easy removal of windup mandrel 10. Removal of the mandrel is also possible upon moving sleeve 48 in a direction toward the opposite end of the mandrel, this sleeve being held in position by spring loaded ball 49. Hence, in following through the simple operational steps required to remove the windup mandrel, the essential advantage of the unique assemblage described is that the driving linkage, i. e., intermeshing teeth of sleeve gear 29, and wheel 30 is left intact. This connection does not have to be disturbed in changing windup mandrels.

Figure 4 also illustrates the position of tachometer generator 17, which is connected to drive shaft 11 through a positively driven linkage comprising an intermeshing toothed wheel 56 attached to the shaft of tachometer generator 17, and toothed wheel 57 attached to the main drive shaft 11.

As many widely different embodiments may be made without departing from the spirit and scope of the invention, it is understood that the invention is not limited except as defined in the appended claims.

Having fully described my invention, I claim:

1. Web winding apparatus comprising in combination a drive shaft positively driven by a motor; rotatable core-supporting means removably connected to said drive shaft; a drive shaft generator driven from said drive shaft at a speed proportional to the speed of said drive shaft; a plurality of cores upon which web is wound mounted on said core-supporting means for free rotation thereon; spacing means mounted on said core-supporting means for rotation therewith and arranged to maintain adjacent cores in spaced relation, said spacing means in frictional driving contact with said cores; a core generator driven from one of said cores at a speed proportional to the speed of said cores; means for subtracting the voltages generated by the drive shaft generator and the core generator to provide a voltage difference; a preset voltage proportional to the desired difference in speed between the speed of the drive shaft and the speed of the cores; means for subtracting said preset voltage from said voltage difference to provide an error voltage; means for supplying said error voltage to the drive shaft motor to decelerate said drive shaft during build-up of web on said cores to maintain a constant difference in speed between said drive shaft and said cores proportional to said preset voltage.

2. Apparatus as in claim 1 wherein the constant difference between drive shaft speed and core speed is less than 50 revolutions per minute.

3. Apparatus as in claim 1 wherein the means for supplying the error voltage to the drive shaft motor to decelerate the drive shaft during build-up of web on the cores comprises an amplifier to amplify the error voltage, a rebalance motor driven by said amplified error voltage, and a potentiometer in the circuit of the drive shaft motor, the resistance of said potentiometer being mechanically controlled by said rebalance motor.

4. Web winding apparatus comprising in combination a drive shaft positively driven by a motor; rotatable core-supporting means removably connected to said drive shaft; a sleeve removably mounted on said core-supporting means; a drive shaft generator driven from said drive shaft at a speed proportional to the speed of said drive shaft; a plurality of cores upon which web is wound mounted on said core-supporting means for free rotation thereon; spacing means mounted on said core-supporting means for rotation therewith and arranged to maintain adjacent cores in spaced relation, said spacing means in frictional driving contact with said cores; a sleeve gear removably mounted on said sleeve for free rotation thereon and removably connected to a core for rotation therewith; a core generator driven from said sleeve gear at a speed proportional to the speed of said cores; means for subtracting the voltages generated by the drive shaft generator and the core generator to provide a voltage difference; a preset voltage proportional to the desired difference in speed between the speed of the drive shaft and the speed of the cores; means for subtracting said preset voltage from said voltage difference to provide an error voltage; means for supplying said error voltage to the drive shaft motor to decelerate said drive shaft during build-up of web on said cores to maintain a constant difference in speed between said drive shaft and said cores proportional to said preset voltage.

5. Apparatus as in claim 4 wherein the constant difference between drive shaft speed and core speed is less than 50 revolutions per minute.

6. Apparatus as in claim 4 wherein the means for supplying the error voltage to the drive shaft motor to decelerate the drive shaft during build-up of web on the cores comprises an amplifier to amplify the error voltage, a rebalance motor driven by said amplified error voltage, and a potentiometer in the circuit of the drive shaft motor, the resistance of said potentiometer being mechanically controlled by said rebalance motor.

References Cited in the file of this patent
UNITED STATES PATENTS

| | | |
|---|---|---|
| 1,506,327 | Perrault | Aug. 6, 1924 |
| 2,431,130 | Luchansky | Nov. 18, 1947 |
| 2,469,706 | Winther | May 10, 1949 |